3,318,860
OLEFIN POLYMERIZATION PROCESS AND CATALYST COMPRISING TRANSITION METAL HALIDE, AN ORGANOMETALLIC COMPOUND, HYDROGEN AND AN AMINE
Raymond Eichenbaum, Spotswood, N.J., assignor to Mobil Oil Corporation, a corporation of New York
No Drawing. Filed Dec. 9, 1963, Ser. No. 329,236
18 Claims. (Cl. 260—93.7)

This invention is concerned with preparation of polymers of olefinic hydrocarbons. It is more particularly concerned with an improved catalyst system for producing crystalline polyolefins of reduced molecular weight.

As is well known to those with the art, highly tactic polymers of olefinic hydrocarbons having the formula, $CH_2=CHR$, wherein R is an alkyl radical having one to eight carbon atoms, a cycloalkyl radical, or an aryl radical, can be prepared in the presence of a catalyst system comprising (A) a compound of a transition metal of Groups IV–A, V–A, VI–A, and VIII of the Periodic Arrangement of the Elements wherein the metal is present in a valence state lower than its maximum and (B) an organometallic compound of metals of Groups II and III of the Periodic Arrangement of the Elements. Crystalline linear polyethylene can also be produced under relatively mild conditions, in the presence of the aforedescribed catalyst system. Such polymers, however, tend to have a very high degree of polymerization, i.e., a very high average molecular weight. This property, with concomitant high viscosity and melting point, renders the polymer difficult to work and disadvantageous in polymer applications, such as plastic molding.

In the United States Letters Patent No. 3,051,690, a process has been proposed to reduce the average molecular weight of such polymers by carrying out the polymerization in the presence of hydrogen. In that process hydrogen gas, in an amount based upon the amount of olefin monomer charged, is introduced into the polymerization zone or reaction vessel either in the beginning of the polymerization or during the polymerization reaction. Frequently, however, in the case of olefin monomers other than ethylene, when molecular weight is controlled in this manner, the tacticity tends to be reduced as the molecular weight decreases. It is highly desirable to produce tactic polymers having both reduced molecular weight and high degree of tacticity.

The term "tactic" is a generic term applied to polymers in which there is an ordered structure with respect to the configurations around at least one main-chain site of steric isomerism per conventional base unit. Numerous types of tacticity are recognized in the art. Within the contemplation of this invention, a measure of steric order is the weight percent of the solid polymer that is insoluble in boiling n-heptane. A linear polymer of one or more monoolefinic hydrocarbons that is insoluble in boiling n-heptane is considered to be tactic.

It has now been found that lower molecular weight crystalline linear polyethylene and tactic polymers of alpha-olefinic hydrocarbons that have both reduced molecular weight and high degree of tacticity can be produced readily in the presence of a novel catalyst system. It has been discovered that such polymers are produced when the catalyst system of transistion metal compound and organometallic compound, as aforementioned, is treated with hydrogen and there is combined therewith a nitrogen-containing Lewis base that is present during the hydrogen treatment or which may be combined with the transition metal compound and the organometallic compound following the hydrogen treatment.

Accordingly, it is a broad object of this invention to provide an improved polymerization catalyst system. Another object is to provide an improved polymerization process. A specific object is to provide an improved catalyst system for producing linear polyethylene and tactic polymers of alpha-olefinic hydrocarbons. Another specific object is to provide a method for producing low molecular weight crystalline linear polyolefins, and tactic polymers having reduced molecular weight and a high degree of tacticity. A further specific object is to provide an improved continuous process for producing highly tactic polymers. Other objects and advantages of this invention will become more apparent to those skilled in the art from the following detailed description.

This invention provides an improved catalyst system for producing crystalline linear polyethylene and tactic polymers of alpha-olefinic hydrocarbons that is prepared by combining (A) a compound of a transition metal, (B) an organometallic compound and (C) a nitrogen-containing Lewis base and treating the combination including at least said (A) a compound of a transition metal and said (B) an organometallic compound with hydrogen, in an amount between 1 mole and about 100 moles per mole of said compound of a transition metal; said compound of a transition metal being a compound of a metal of groups IV–A, V–A, VI–A, and VIII of the Periodic Arrangement of the Elements wherein the metal is present in a valence state lower than its maximum; and said organometallic compound being a compound of a metal of Groups II and III of the Periodic Arrangement of the Elements.

Another embodiment of this invention provides an improved polymerization of olefinic hydrocarbons carried out in the presence of this improved catalyst system.

Another embodiment of this invention provides, in a continuous process for producing polymers of the olefinic hydrocarbon ethylene or olefinic hydrocarbons having the formula, $CH_2=CHR$, wherein R is an alkyl radical having from one to eight carbon atoms, a cycloalkyl radical, or an aryl radical; wherein a catalyst system is continuously introduced into a polymerization zone, at least one of said olefinic hydrocarbons is continuously introduced into said polymerization zone in contact with said catalyst system to produce polymer product, and polymer product is continuously withdrawn from said polymerization zone; the improvement wherein said catalyst system is formed by combining (A) a compound of a transition metal, (B) an organometallic compound, (C) a nitrogen-containing Lewis base, and hydrogen; said compound of a transition metal being a compound of a metal of Groups IV–A, V–A, VI–A, and VIII of the Periodic Arrangement of the Elements wherein the metal is present in a valence state lower than its maximum; and said organometallic compound being a compound of a metal of Groups II and III of the Periodic Arrangement of the Elements.

The monomer that is polymerized with the catalyst of this invention can be ethylene or an olefinic hydrocarbon having the formula, $CH_2=CHR$, wherein R is an alkyl radical having from one to eight carbon atoms, a cycloalkyl radical, or an aryl radical. Nonlimiting examples of the monomer reactant are ethylene; propylene; butene-1; pentene-1; 3-methylbutene-1; hexene-1; 3-methylpentene-1; 4-methylpentene-1; heptene-1; methylheptene-1; octene-1; nonene-1; decene-1; vinyl cyclohexane; styrene; p-methylstyrene and other ring alkyl-substituted styrenes. Copolymerization with two or more monomers is contemplated, as well as homopolymerization.

The catalyst system used in the process of this invention is formed by combining at least three components, one of said components being a compound of a transition metal of Groups IV–A, V–A, VI–A, and VIII of the Periodic Arrangement of the Elements in a reduced valence state, the second of said components being an organometallic compound of a metal of Groups II and III of the Periodic Arrangement of the Elements, and the third of said components being a nitrogen-containing Lewis base, and treating the combination including at least said first and said second components with hydrogen. The Periodic Arrangement of the Elements as referred to herein, is that published in the Journal of Chemical Education, volume 16, page 409 (1939).

Among the reducible metal compounds suitable for producing the transition metal compound component for the purposes of this invention are the heavy metal, inorganic compounds such as halides, oxyhalides, complex halides, hydroxides; and organic compounds such as alcoholates, acetates, benzoates, and acetyl acetonates, of the metals of Groups IV–A, V–A, VI–A, and VIII of the Periodic Arrangement of the Elements. Such metals include titanium, zirconium, hafnium, thorium, uranium, vanadium, niobium, tantalum, chromium, molybdenum, tungsten and iron. The metal halides, particularly the chlorides are generally preferred. Titanium, zirconium, and vanadium are the most active metals. The following heavy metal compounds are readily reducible: titanium tetrachloride, titanium tetrabromide, zirconium tetrachloride, vanadium tetrachloride, and zirconium acetylacetonate.

In order to form the transition metal compound component, these heavy metal compounds can be reduced to valence states lower than maximum valence by a number of methods well known in the art. Taking as an example titanium tetrachloride, it can be reduced by hydrogen to titanium trichloride (with or without some titanium dichloride), a brown amorphous substance which can be converted into the violet crystalline form by heating at an elevated temperature in the order of 200° C. The reduction can be accomplished by heating titanium tetrachloride with metallic titanium or aluminum under pressure. This reduction can be promoted by Friedel-Crafts halides. In the case of the aluminum reduction, the product will comprise reduced titanium chloride and aluminum trichloride. The reduction can also be effected by an organometallic compound of Group II or III to produce a crystalline titanium halide in a valence state lower than maximum. Suitable materials for this reduction are aluminum alkyls, the aluminum trialkyls being preferred. In practicing the present invention, the particular method of obtaining the heavy metal compound of reduced valence state is not critical. Indeed, many reduced compounds contemplated herein are commercially available.

The second component of the catalyst system is an organometallic compound of a metal of Groups II and III. These compounds will have at least one hydrocarbon radical, i.e., alkyl, cycloalkyl, aralkyl, or aryl, attached to the metal through a carbon atom. The other substituents in the organometallic compound can be hydrocarbon radicals, halogen radicals, alkoxy, amino, hydrogen, etc., or combinations thereof. Non-limiting examples of the organometallic compounds are triethylaluminum, tripropylaluminum, dipropylzinc, triisobutylaluminum, diethylmagnesium, diphenylaluminum chloride, cyclohexylethylzinc, diethylaluminum bromide, diethylaluminum chloride, ethylzinc chloride, propylmagnesium chloride, dipropylaluminum chloride, diacetylaluminum chloride, diisobutylaluminum hydride, phenylaluminum dihydride, cyclohexylbromoaluminum hydride, dipropylaluminum hydride, propyl zinc hydride, ethylmagnesium hydride, lithium aluminum hydride, methoxyaluminum diethyl, and alkyl aluminum sesquihalides such as ethyl aluminum sesquichloride.

In combining the reduced transition metal compound, e.g., $TiCl_3$, with a metal organic compound, e.g., aluminum trialkyl, various proportions may be used. For instance, the molar Al/Ti ratio of these two constituents may range from 0.1 to 20, preferably from about 1 to about 10 mols of the aluminum trialkyl or other organometallic compound per mol of $TiCl_3$ or other partially reduced transition metal compound.

The third component of the catalyst system is a Lewis base compound containing nitrogen. In this specification and the appended claims, a Lewis base means a compound which fulfills the definition proposed by G. N. Lewis, who founded his theory of acid-base reactions on the assumption that neutralization depends on the formation of a co-ordinate bond between an acid and base to give an entity which might be stable or unstable. Accordingly, the distinguishing feature of a Lewis acid is its ability to accept one or more electron pairs to fill a corresponding vacancy or vacancies in the electronic grouping of an atom of the acid molecule or in a radical or ion formed by the acid, while a Lewis base is a compound having in the molecule, or in a radical or ion formed thereby, an atom capable of donating at least one electron pair to such a vacant site. Lewis base compounds are also known as electron donors or "onium" compounds. Various Lewis base compounds containing nitrogen can be used in the catalyst system of the present invention. Non-limiting examples of such nitrogen-containing Lewis base compounds suitable for purposes of the present invention are ammonia, triethanolamine, primary alkyl amines such as methylamine, ethylamine, normal propylamine, isopropylamine, normal amylamine, iso-amylamine and hexylamine; secondary alkyl amines such as dimethylamine and diethylamine; tertiary alkyl amines such as trimethylamine and triethylamine; arylamines such as aniline and its N-alkyl derivatives and diphenylamine; pyridine; and derivatives of other organic nitrogen compounds which may contain non-interfering substituents. For purposes of the present invention, the weaker (higher pK value) Lewis bases are generally relatively more effective. A specific nitrogen-containing Lewis base preferred for use in the catalyst system of the present invention is pyridine. The amount of the Lewis base to be used in the catalyst is generally relatively small, e.g. an amount sufficient to effect a molar ratio of Lewis base to the aluminum trialkyl or other organometallic compound of about 0.1, although the molar ratio can range from about 0.01 to about 1.0. If desired, two or more nitrogen-containing Lewis bases may be present together in the polymerization catalyst system of the present invention.

The novel catalyst system of this invention can be formed by combining the transition metal compound component, the organometallic compound component and the nitrogen-containing Lewis base compound component, and treating with hydrogen in the absence of olefin monomer. If desired, the nitrogen-containing Lewis base compound component may be added to the catalyst system of this invention after the combination of transition metal compound component and organometallic compound component is treated with hydrogen.

The amount of hydrogen gas that is contacted with the catalyst components should be between about one mole and about a hundred moles per mole of transition metal compound.

The catalyst system can be prepared in several ways, including:

(1) The transition metal compound component, the organometallic compound component and the nitrogen-containing Lewis base compound component can be mixed and heated in the presence of hydrogen, at a temperature of between about 68° F. (20° C.) and about 170° F. (77° C.), for a period of time of between about 5 minutes and about one hour.

(2) The transition metal compound component, the organometallic compound component and the nitrogen-containing Lewis base compound component can be initially mixed and heated in an inert atmosphere, at a temperature of between about 68° F. (20° C.) and about 170° F. (77° C.), for a period of time of between about 5 minutes and about one hour. The hydrogen is introduced and mixing is continued at a temperature of between about 68° F. (20° C.) and about 150° F. (60° C.) for a period of time of between about 10 minutes and about 20 hours.

(3) In the particular case wherein a transition metal compound of higher valence state is reduced with hydrogen to form the transition metal compound component, excess hydrogen can be maintained in the system during subsequent grinding and final reaction with the organometallic compound component.

(4) In the case wherein the hydrogen is introduced following mixture of the transition metal compound component and the organometallic compound component, the nitrogen-containing Lewis base compound component can thereafter be introduced before contacting the resulting catalyst system with the olefin monomer.

The catalyst components are usually combined in an inert organic diluent for ease in mixing, handling, and storing. A diluent may be omitted, however. Suitable diluents are aliphatic hydrocarbons such as hexane, heptane, isooctane, etc.; cycloaliphatic hydrocarbons such as cyclohexane; aromatic hydrocarbons such as benzene, toluene, xylene, decalin; highly paraffinic hydrocarbon fractions; and distillate fractions rich in mononuclear aromatic hydrocarbons.

The molecular configurations present in the novel catalyst composition of this invention are not known. The performance of the novel catalyst composition, however, demonstrates the it is different in nature from conventional catalysts. Thus, in the case of tactic polymers produced under identical polymerization conditions, the catalyst of this invention produces a polymer having substantially the same degree of tacticity and a lower molecular weight than the polymer produced when the olefin monomer is contacted with a catalyst combination including the transition metal compound component and organometallic compound component and treated with hydrogen but not including a nitrogen-containing Lewis base.

The amount of the catalyst system of this invention used in carrying out polymerization of olefins can vary widely from a minor catalytic amount to a large excess. The olefin charge rate can be as high as about 10,000 moles per mole of transition metal compound. In a preferred embodiment of the polymerization process of this invention, the olefin charge rate is at least as great as about 10,000 grams per gram of nitrogen-containing Lewis base compound. Conversion will vary from about 50 grams to about 2000 grams of polymer per gram of transition metal compound, generally from about 200 to about 1000 grams of polymer per gram of transition metal compound.

The polymerization reaction is carried out at temperatures varying between about −80° C. (−112° F.) and about 220° C. (428° F.), preferably between about 20° C. (68° F.) and about 150° C. (302° F.). The pressure employed in the reactor can be substantially atmospheric pressure or up to about 30 atmospheres pressure and higher. In practice the pressure will be between about one and about 10 atmospheres.

The polymerization reaction may be carried out in the presence of a diluent. Suitable diluents are the same hydrocarbon diluents described hereinbefore as utilizable in the preparation of the catalyst system. If a diluent is employed, it can be the same diluent used (if any is used) in the catalyst preparation or it can be a different hydrocarbon diluent. It is also contemplated to operate without use of an extraneous diluent. In this case there is used an excess of olefin monomer which will remain at least partially in the liquid phase and act as a diluent for the polymerization reaction.

Upon completion of the polymerization reaction, the catalyst may be completely deactivated and polymer product coagulated, e.g. by the addition of an alcohol such as methanol, isopropyl alcohol, or n-butyl alcohol, in amounts from about 10 to 100 times the amount of catalyst used. The alcohol may contain an antioxidant, in an amount from about 0.01 to about 5.0 wt. percent of the alcohol. The reaction slurry may then be filtered, the filter cake reslurried in a catalyst solvent such as dry, concentrated alcohol at about 50 to 100 C. for from 15 to 60 minutes, filtered again and that filter cake dried, preferably under reduced pressure. Ash residues in the polymer are reduced below about 0.05% by this procedure. If necessary the ash content may be further reduced, e.g., by aqueous acid treatment according to methods well known in the art, or by using chelating agents, such as acetylacetone.

In using the catalyst system of this invention for polymerization, the polymerization reaction can be carried out batchwise. The process is however, readily and feasibly carried out in a continuous system.

With reference to a specific embodiment of the invention, the process will be described in relation to the polymerization of propylene using a titanium trichloride-diethylaluminum chloride-pyridine combination that is treated with hydrogen. It will be understood that other olefins and catalyst combinations, as described hereinbefore, can be used.

Diethylaluminum chloride ($Et_2AlCl$) and pyridine ($C_5H_5N$), preferably distilled and thoroughly dried, are combined in a reaction vessel in desired proportion, such as with an Al:pyridine molar ratio of 10. Preferably a diluent, such as n-heptane, is used. The mixture of two catalyst components and diluent is heated under reflux at a temperature of from 50 to 175° C., preferably about 92° C., and cooled to about room temperature under an atmosphere of inert gas, such as nitrogen.

The cooled mixture is combined with titanium trichloride in desired proportion, such as with an Al/Ti molar ratio of 2. Additional diluent, preferably n-heptane, can be combined with the cooled mixture before or following the addition of titanium trichloride to the catalyst composition.

The mixture of catalyst components and diluent is heated at a temperature of from 50 to 95° C., preferably about 77° C., under an atmosphere of inert gas, up to 4 hours, preferably for about 15 minutes, and then cooled to between room temperature and 75° C., preferably about 60° C.

The resultant slurry is then treated with hydrogen, in the same vessel or a different vessel, to produce the catalyst system of this invention. The hydrogen can be pressured into the slurry vessel with sucessive inert gas purges, if desired, and is added in desired proportion to the slurry components, such as with a $H_2/Ti$ molar ratio of from 1 to 100, preferably from about 5.0 to 10.0. As noted hereinbefore, the mixing of the three catalyst components and treatment with hydrogen can be carried out in two successive steps. Alternatively, hydrogen can be added during the initial combination of the catalyst components. Also as noted hereinbefore, the pyridine component may alternatively be added to the combination of diethyl aluminum chloride and titanium trichloride after hydrogen treatment of the combination and before contacting the catalyst composition and the olefin monomer.

In a polymerization vessel operated at a polymerization temperature, e.g. from about 50° C. to about 90° C., a catalytic amount of the catalyst system is combined with sufficient of the monomer (propylene) to reach polymerization pressure, e.g. about 150 p.s.i.g. Propylene can be continuously introduced, in an amount sufficient to maintain desired pressure.

After about 10 minutes to 8 hours, preferably about 30 minutes, the crude polymer product and catalyst in the diluent are withdrawn from the polymerization vessel and treated with alcohol. e.g. methanol, which may contain an antioxidant, to deactivate (quench) the catalyst. The quenched mixture is filtered to separate the polymer, which can be subjected to further purification, such as by further alcohol washing, and to stabilization and drying to produce finished polymer.

The following examples demonstrate the improved catalyst system of this invention and the utilization and advantages thereof in a polymerization process. In all runs, the combination including at least the transition metal compound component and the organometallic compound component was treated with hydrogen before contact with the olefin monomer.

In all four runs, the polymerization reaction was carried out as follows:

*Polymerization method*

Into a one gallon autoclave containing 1500 cc. of n-heptane and catalyst prepared as described fully hereinafter, purged of oxygen and heated to 60° C. in Runs 1 and 2 (to 77° C. in Runs 3 and 4), propylene was charged to reach and maintain a reaction pressure of 150 p.s.i.g. The polymerization reaction was terminated after 30 minutes by adding 250 cc. of methanol containing 0.2% (vanlube) antioxidant to deactivate the catalyst. The polymer was separated from the supernatant liquid by filtration, and was then washed with additional methanol, stabilized and dried. In order to determine the order of magnitude of molecular weight, the reduced specific viscosity (RSV) of the whole, dried polymer and of the tactic portion thereof was determined in accordance with ASTM Procedure D1601–59T. To assess the flow characteristics of the polymer product, the melt index (flow rate by extrusion plastometer) of the whole dried polymer and of the tactic portion thereof was determined in accordance with ASTM Procedure D1238–57T. The percent of the dried polymer that was insoluble in boiling n-heptane, i.e. the percent tacticity, was also determined.

*Catalyst preparation method*

In a 125 cc. round bottom flask, 0.08 cc. (1.082 millimoles) of distilled, thoroughly dried pyridine was combined with 6.9 cc. (10.82 millimoles) of 25% diethyl aluminum chloride in n-heptane solution, and the resulting mixture was heated under reflux for 90 minutes at 92° C., then cooled to room temperature under a nitrogen blanket, and added to 1500 cc. of n-heptane contained in a one-gallon autoclave. One gram (5.41 millimoles) of titanium trichloride was combined with the mixture in the autoclave and, under a nitrogen blanket, the autoclave contents were heated to 77° C. in 30 minutes, maintained at that temperature for 15 minutes, and then cooled to 60° C. in 5 minutes. Hydrogen at 40 p.s.i.g. (46.8 millimoles) was then fed into the autoclave with three successive nitrogen purges. The resulting catalyst system was used in the aforedescribed polymerization process in Runs 2 and 4 of this disclosure. Pertinent data and properties of the polypropylene product are set forth in the table.

For comparison purposes, a second catalyst system was produced under conditions identical to the above-described catalyst preparation method except that no pyridine or other Lewis base was added to the catalyst system. Thus, in the comparison catalyst preparation, 6.9 cc. (10.82 millimoles) of 25% diethyl aluminum chloride in n-heptane was added directly into 1500 cc. of n-heptane contained in a one gallon autoclave. One gram (5.41 millimoles) of titanium trichloride was combined with the mixture in the autoclave and, under a nitrogen blanket, the autoclave contents were heated to 77° C. in 30 minutes, maintained at that temperature for 15 minutes, and then cooled to 60° C. in 5 minutes. Hydrogen at 40 p.s.i.g. (46.8 millimoles) was fed then into the autoclave with three successive nitrogen purges. The resulting catalyst system was used in the aforedescribed polymerization process in Runs 1 and 3 of this disclosure. Pertinent data and properties of the polypropylene product are set forth in the table.

TABLE

| Run No. | Catalyst System | Polymerization Temperature, °C. | Polymerization Product | | | | |
|---|---|---|---|---|---|---|---|
| | | | Isotactic Index (wt. percent insoluble in boiling n-heptane) | Reduced Specific Viscosity | | Melt Index | |
| | | | | Whole | Tactic | Whole | Tactic |
| 1 | No pyridine included | 60 | 98 | 2.5 | 2.5 | 1.2 | 1.1 |
| 2 | Pyridine included | 60 | 97.5 | 1.8 | 1.8 | 8.3 | 5.7 |
| 3 | No pyridine included | 77 | 93 | 2.4 | 2.4 | 1.8 | 1.5 |
| 4 | Pyridine included | 77 | 93 | 1.5 | 1.7 | 9.4 | 8.3 |

From the data in the table, it will be apparent in comparison with polymerization with the catalyst system containing no Lewis base (Runs 1 and 3), that the use of the catalyst system of this invention (Runs 2 and 4) including a nitrogen-containing Lewis base produced a polymer having decreased molecular weight, measured as reduced specific viscosity, and increased melt index, without a significantly lower degree of tacticity.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A catalyst composition for use in producing crystalline linear homopolymers of α-monoolefins, comprising (A) a transition metal halide in which the transition metal is a metal of Groups IV–A, V–A, VI–A, and VIII of the Periodic Arrangement of the Elements and in which the metal is present in a valence state lower than its maximum, (B) an organometallic compound of a metal of Groups II and III of the Periodic Arrangement of the Elements and (C) an amino Lewis base compound, further characterized in that a combination including at least said (A) a transition metal halide and said (B) an organometallic compound is treated with hydrogen in an amount between about one mole and about 100 moles per mole of said (A) a transition metal halide; the molar ratio of (B) to (A) being between about 0.1 and about 20; and the molar ratio of (C) to (A) being between about 0.01 and about 1.

2. The catalyst composition defined in claim 1, wherein the combination treated with hydrogen includes said (C) an amino Lewis base.

3. The catalyst composition defined in claim 2, wherein said (A) is a titanium halide.

4. The catalyst composition defined in claim 3, wherein said (B) an organometallic compound is an organoaluminum compound.

5. The catalyst composition defined in claim 4, wherein said (C) is a tertiary amine.

6. An improved catalyst composition prepared by combining (A) titanium trichloride, (B) diethylaluminum chloride and (C) pyridine, and treating the combination including at least said (A) titanium trichloride and said (B) diethylaluminum chloride with hydrogen in an amount varying between about one mole and about 100 moles per mole of said titanium trichloride; the molar ratio of (B) to (A) being between about 1 and about 10; and the molar ratio of (C) to (A) being between about 0.1 and about 1.0.

7. In the catalytic homopolymerization of α-monoolefinic hydrocarbons to crystalline linear polymers, the improvement that comprises carrying out said polymerization in the presence of the catalyst system defined in claim 1.

8. In the catalytic homopolymerization of α-monoolefinic hydrocarbons to crystalline linear polymers, the improvement that comprises carrying out said polymerization in the presence of the catalyst system defined in claim 2.

9. In the catalytic polymerization of propylene to tactic polypropylene, the improvement that comprises carrying out said polymerization in the presence of the catalyst system defined in claim 3.

10. In the catalytic polymerization of propylene to tactic polypropylene, the improvement that comprises carrying out said polymerization in the presence of the catalyst system defined in claim 4.

11. In the catalytic polymerization of propylene to tactic polypropylene, the improvement that comprises carrying out said polymerization in the presence of the catalyst system defined in claim 5.

12. In the catalytic polymerization of propylene to tactic polypropylene, the improvement that comprises carrying out said polymerization in the presence of the catalyst system defined in claim 6.

13. In a continuous process for producing linear crystalline homopolymers of α-monoolefinic hydrocarbons; wherein a catalyst system is continuously introduced into a polymerization zone, an olefinic hydrocarbon is continuously introduced into said polymerization zone in contact with said catalyst system to produce polymer product, and polymer product is continuously withdrawn from said polymerization zone; the improvement wherein said catalyst system is the catalyst system defined in claim 1.

14. In a continuous process for producing linear crystalline homopolymers of α-monoolefinic hydrocarbons; wherein a catalyst system is continuously introduced into a polymerization zone, an olefinic hydrocarbon is continuously introduced into said polymerization zone in contact with said catalyst system to produce polymer product, and polymer product is continuously withdrawn from said polymerization zone; the improvement wherein said catalyst system is the catalyst system defined in claim 2.

15. In a continuous process for producing tactic polypropylene wherein a catalyst system is continuously introduced into a polymerization zone, propylene is continuously introduced into said polymerization zone in contact with said catalyst system to produce tactic polypropylene product, and tactic polypropylene product is continuously removed from said polymerization zone; the improvement wherein said catalyst system is the catalyst system defined in claim 3.

16. In a continuous process for producing tactic polypropylene wherein a catalyst system is continuously introduced into a polymerization zone, propylene is continuously introduced into said polymerization zone in contact with said catalyst system to produce tactic polypropylene, and tactic polypropylene is continuously removed from said polymerization zone; the improvement wherein said catalyst system is the catalyst system defined in claim 4.

17. In a continuous process for producing tactic polypropylene wherein a catalyst system is continuously introduced into a polymerization zone, propylene is continuously introduced into said polymerization zone in contact with said catalyst system to produce tactic polypropylene, and tactic polypropylene is continuously removed from said polymerization zone; the improvement wherein said catalyst system is the catalyst system defined in claim 5.

18. In a continuous process for producing tactic polypropylene wherein a catalyst system is continuously introduced into a polymerization zone, propylene is continuously introduced into said polymerization zone in contact with said catalyst system to produce tactic polypropylene, and tactic polypropylene is continuously removed from said polymerization zone; the improvement wherein said catalyst system is the catalyst system defined in claim 6.

References Cited by the Examiner
UNITED STATES PATENTS

| | | | |
|---|---|---|---|
| 3,050,471 | 8/1962 | Anderson | 260—93.7 |
| 3,051,690 | 8/1962 | Vandenberg | 260—93.7 |
| 3,081,287 | 3/1963 | Coover | 260—93.7 |
| 3,139,418 | 6/1964 | Marullo | 260—93.7 |
| 3,147,241 | 9/1964 | Moberly | 260—93.7 |
| 3,155,626 | 11/1964 | Boor | 260—93.7 |
| 3,239,497 | 3/1966 | Machida et al. | 260—93.7 |
| 3,256,259 | 6/1966 | Seger et al. | 260—93.7 |

JOSEPH L. SCHOFER, Primary Examiner.

M. B. KURTZMAN, Assistant Examiner.